United States Patent [19]
Handforth

[11] Patent Number: 5,329,576
[45] Date of Patent: Jul. 12, 1994

[54] WIRELESS COMMUNICATION ZONE MANAGEMENT SYSTEM

[75] Inventor: Martin R. Handforth, Kanata, Canada

[73] Assignee: Mitel Corporation, Canada

[21] Appl. No.: 875,981

[22] Filed: Apr. 29, 1992

[30] Foreign Application Priority Data

May 23, 1991 [CA] Canada .................. 2043127

[51] Int. Cl.⁵ .................. H04M 11/00; H04H 1/02; H04Q 7/00; H04B 1/00
[52] U.S. Cl. .................. 379/59; 379/58; 379/60; 379/61; 455/6.1; 455/33.1; 455/33.2; 455/55.1
[58] Field of Search ......... 379/55, 58, 59, 60, 379/61; 455/6.1, 14, 33.1, 33.2, 55.1

[56] References Cited

U.S. PATENT DOCUMENTS

| | | | |
|---|---|---|---|
| 4,006,315 | 2/1977 | Halstead | 455/55.1 |
| 4,012,662 | 3/1977 | Martin | 455/55.1 |
| 4,053,835 | 10/1977 | Breitenbach | 455/55.1 |
| 4,476,574 | 10/1984 | Struven | 455/55.1 |
| 4,790,000 | 12/1988 | Kinoshita | 379/61 |
| 4,866,732 | 9/1989 | Carey et al. | 379/63 |
| 4,881,271 | 11/1989 | Yamauchi et al. | 379/58 |
| 4,941,207 | 7/1990 | Maeda et al. | 455/55.1 |
| 4,972,505 | 11/1990 | Isberg | 455/55.1 |

FOREIGN PATENT DOCUMENTS 1247266 12/1988 Canada .

OTHER PUBLICATIONS

British Telecom Technical Journal vol. 3, No. 2, Apr. 1985.

Primary Examiner—Stephen Chin
Assistant Examiner—Vijay Shankar
Attorney, Agent, or Firm—Laff, Whitesel, Conte & Saret

[57] ABSTRACT

A wireless communication system comprising a plurality of antennae, the antennae being arranged in a grid pattern over a communication region, wireless portable terminals located within the communication region for emitting and/or receiving electromagnetic signals via the antennae, apparatus for determining the position of at least one of the terminals within the communication region relative to the grid pattern.

17 Claims, 6 Drawing Sheets

WIRELESS COMMUNICATION ZONE MANAGEMENT SYSTEM

FIELD OF THE INVENTION

This invention relates to wireless communication systems, and in particular to a system for managing the location of a wireless remote terminal within a local region.

BACKGROUND TO THE INVENTION

Commercial wireless communication systems have become very popular. In particular, one such system, referred to as a cellular system, is used widely for communication between portable telephones carried in automobiles by persons. In such systems the power of transmitters located in a communication region define so-called "cells". When an active wireless portable terminal moves from cell to cell, this is sensed and control of a call in progress is "handed off" from the first to a succeeding cell.

Other types of wireless communication systems are for example a cordless telephone in which a single wireless handset communicates with a single base station on one of several designated frequencies, a so-called CEPT system, which involves analog FM operation utilizing 40 channel pairs and dynamic channel pair allocation, a Telepoint system, presently implemented in the U.K., which provides a simple one-way service allowing direct radio access to base stations situated at fixed locations such as railroad stations, shopping centers, gas stations, restaurants, hotels, etc., and others. Standards for such services have evolved, such as the so called CT-2 and CT-3 standards.

Such systems all have basic limitations in their channel capacity; only a limited number of channels can be made available within a given region. Therefore the systems are not feasible in a region in which there is a high density of users, such as several thousand persons within a high rise building within the high density core region of a city, which building may be adjacent another housing several thousand persons. In such case, not only is there a high demand for the limited channel capacity, but due to the nature of building structural materials, reflections and null regions and phase shifts abound, affecting the qualities and reliability of communication as the portable wireless terminal is carried while in use.

In Canadian Patent 1,247,266 issued Dec. 20, 1988, invented by Michael J. Carey and Adrian J. Anderson, a system for use in such environments is described, using both wire antenna and leaky cable antennae, and using spread spectrum communication. The system substantially reduces or eliminates null regions, and because as in one embodiment the antenna is a leaky cable which is located relatively close to the portable wireless terminals, e.g. contained in the ceiling, the radiated power can be low, substantially eliminating or reducing the effects of reflections and null regions caused by the building structure. The leaky cable (leaky feeder) could be strung to saturate the entire communication region fairly evenly with electromagnetic energy.

A leaky feeder distribution system for office communication is also described in the article "Cordless Telecommunications in the U.K.", by R. S. Swain, published in the BRITISH TELECOM TECHNICAL JOURNAL, Vol. 3, No. 2, April 1985. Here it is stated that the feeders are a particularly attractive option for the wireless PABX concept. While leaky feeders can be successfully used in an office communication region, they have heretofore not been able to be used to locate the position of the portable terminal.

SUMMARY OF THE INVENTION

The present invention is a wireless communication system that facilitates location of the portable wireless terminal itself. Thus it can be used to locate the position of a wireless beacon (which might be attached, for example, to a mail delivery cart, a repairman, test equipment, etc.), can be used to provide paging to a local region, restricted from the entire population of remote terminals, and can be used to provide two-way communication between portable terminals, or between a portable terminal and a fixed terminal, while increasing the number of terminals that can use a small number of communication frequencies. Thus communication micro-cells are established. This allows a vast increase in the number of users of a limited number of communication frequencies, because the spectrum is reused over small distances; i.e. in every other cell or up to several cells apart.

To provide the above result, leaky feeders are used as antennae in a grid pattern. The intersections of the leaky feeders define centers of the micro-cells. Communication along each alternate parallel feeder is preferably effected using the same pair of frequencies; thus in one embodiment, for example communication using all parallel leaky feeders in one direction can utilize only four frequencies, while communication using the leaky feeders which are orthogonal thereto utilize only another four frequencies. Thus only eight frequencies are required, each pair of frequencies accommodating plural time shared channels. The same frequencies are used over and over; in a three dimensional grid encompassing the interior of a high rise office building, thousands of wireless terminals can be accommodated. More generally, the same spectrum is used on alternate runs of leaky feeders, or on every third run, or every fourth run, etc.

In summary, an embodiment of the invention is a wireless communication system comprising a plurality of antenna, the antennae being arranged in a grid pattern over a communication region, wireless terminals located within the communication region for emitting and/or receiving electromagnetic signals via the antennae, and apparatus for determining the position of at least one of the terminals within the communication region relative to the grid pattern.

It is preferred but not mandatory that each antenna is a leaky coaxial cable, cross-overs within the grid pattern of orthogonal ones of the cables defining the centers of micro-cells for defining the location of the one terminal. The antennae may be lumped, or distributed.

Preferably the apparatus for locating includes plural first base stations including transceivers, each connected to one end of respective ones of the cables which are parallel in one direction, and plural second base stations including transceivers each connected to one end of the cables which are parallel in a second direction.

It should be noted that the term leaky feeder refers to a coaxial cable, sometimes referred to as a leaky coaxial cable, containing apertures in its shield, which allows leakage of radio frequency signal from the interior of the cable to the exterior of the cable. Apertures in the shield can be provided by purposely creating holes in the shield, by the use of loose braid, by the use of a braid with missing wires, etc. Such cables are described in U.S. Pat. No. 4,339,733.

BRIEF INTRODUCTION TO THE DRAWINGS

A better understanding of the invention will be obtained by reference to the detailed description below, in conjunction with the following drawings, in which:

FIG. 1 is a block diagram illustrating the basic concept of an embodiment of the invention, FIG. 2 is a perspective, partly in phantom of a multistorey building in which the invention is used, FIG. 3 is a block diagram of a preferred form of an embodiment of a base station, FIG. 4 is a more detailed block diagram of an embodiment of a base station, FIG. 5 is a block diagram of an embodiment of a portable paging terminal, FIG. 6 is a block diagram of an embodiment of a portable terminal in the form of a beacon, FIG. 7 is a block diagram of an embodiment of a combination two-way voice communication portable terminal with a paging receiver and a beacon, FIG. 8 is a block diagram of another embodiment of the invention, and FIGS. 9 and 10 illustrate variations of the embodiment of FIG. 8.

DETAILED DESCRIPTION OF THE INVENTION

Figure 1:
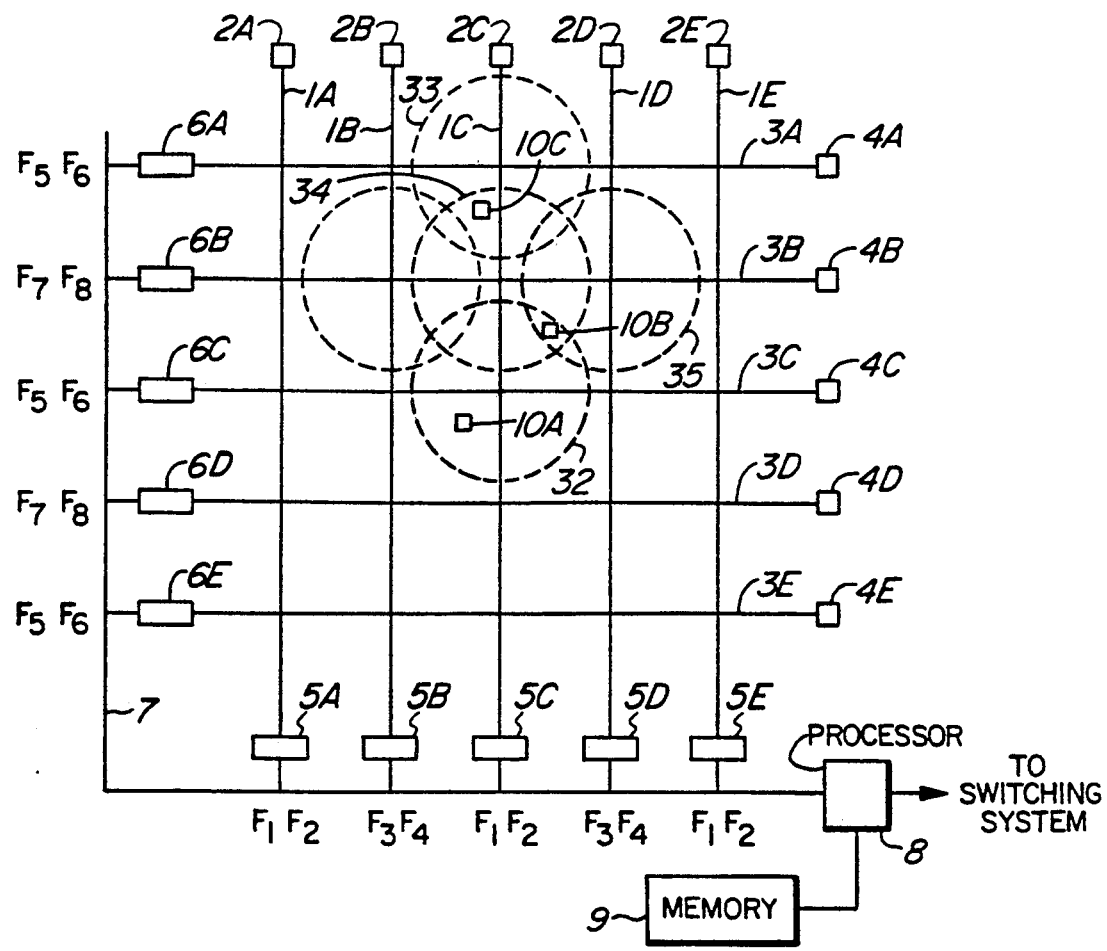

Referring to FIG. 1, a plan view of a grid of leaky coaxial cables is shown. A first group of spaced parallel cables 1A, 1B, 1C, 1D, 1E, etc. are terminated at one end by impedance matching terminations 2A-2E, etc. A second group of spaced parallel leaky coaxial cables 3A-3E, etc. are located orthogonally to the set of cables 1A-1E, and are terminated at one end by terminations 4A-4E respectively. At the opposite ends of leaky cables 1A-1E are connected corresponding base stations 5A-5E respectively, and at the opposite ends of cables 3A-3E are connected corresponding base stations 6A-6E. All of the base stations are connected to a network communication medium (hereinafter network) 7, which can e.g. be optical fiber optic cable.

The network 7 is connected to a processor 8, to which is connected a memory 9.

Plural portable terminals, referenced as 10A, 10B and 10C are located in the environment of the leaky coaxial cables.

Various frequency allocations can be used. During normal two-way communication, in the preferred embodiment each alternate base station utilizes the same pair of communication frequencies. Thus, for example, base stations 5A, 5C and 5E each use the pair of frequencies F1 and F2 while base stations 5B and 5D each use the frequencies F3 and F4. Base stations 6A, 6C and 6E each use the frequencies F5 and F6, while base stations 6B and 6D each use the frequencies F7 and F8.

It is preferred that the frequencies used should be at approximately 180 megahertz, each frequency being modulated by a digital signal which turns the carrier on and off, for the transmission of 1's and 0's, commonly referred to as the DECT form of signalling. The data rate can be e.g. 32 kilobits per second on any carrier frequency which is assigned; spread spectrum could be used.

Each carrier is segmented into twelve duplex time slots; with two frequencies per base station, up to twelve users within the range of one coaxial cable can be accommodated.

Using duplex transmission within a single time slot, with each time slot being 32 kilobits × 12, the transmission rate is 384 kilobits per second. It is preferred that every base station should be in synchronization, all transmitting in the same half frame and receiving in the same alternate half frame. However this can be varied, if desired.

It should be noted that other communication schemes could be used. For example, each base station e.g. 5A-5E can utilize the CT-2 and CT-2P1 standard of communication, which includes one signalling channels F1, ΔF2 and communication channels F5-F20, one communication channel per leaky feeder. The other base stations 6A-6E can utilize signalling channel F3 and F4 and communication channels F21-F40 respectively. This provide an economical system, as there is no redundancy. However if one of the base stations fails, the adjacent base station and adjacent leaky feeders must be utilized for the terminals served by the failed base station.

In another embodiment, each base station 5A-5E and 6A-6E can communication using any of the frequencies F1-F40, which results in a redundant system.

The system could alternatively use the CT-3 standard in which each base station can communicate using a reduced set of frequencies, e.g. F1-F8, each portable terminal communicating in a digital time shared manner.

While the communication frequency format described herein is the preferred mode of communication, the present invention is not restricted thereto.

The base stations also each preferably includes a receiver for a beacon frequency $f_b$, and a transmitter of a pager frequency $f_p$.

Figure 2:
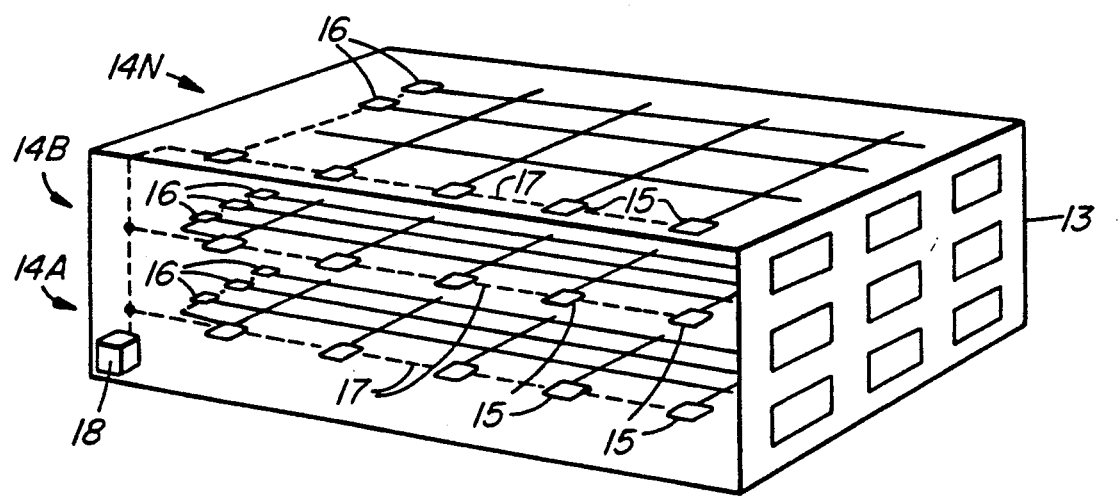
Figure 3:
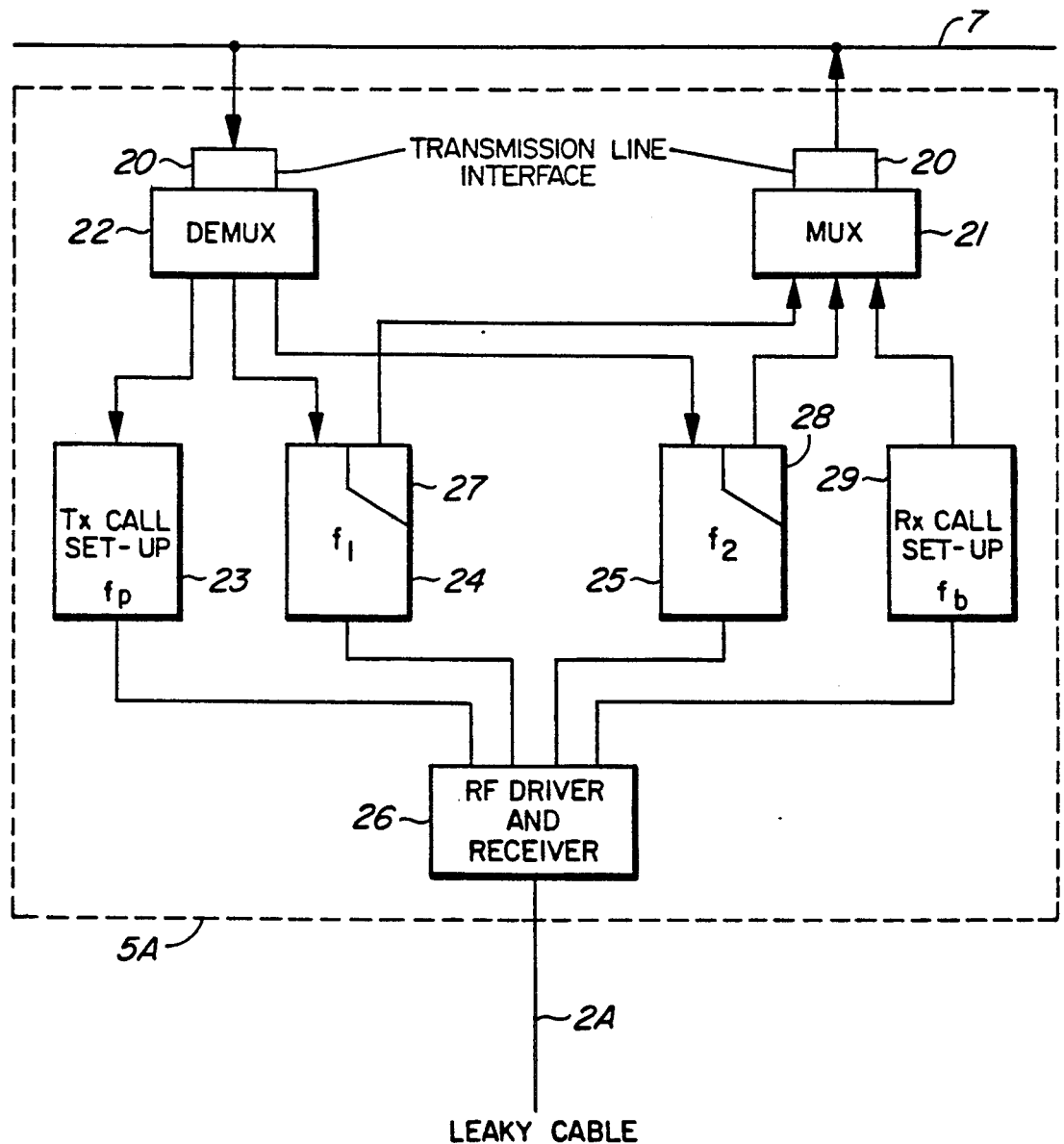

Before describing further the operation of the invention, reference is made to FIGS. 2 and 3. FIG. 2 illustrates a multi-storey building 13, each storey of which contains a grid 14A, 14B . . . 14N of leaky cables of the form shown in FIG. 1. Each grid is terminated as described earlier (the terminations not shown in FIG. 2) and the mutually orthogonal cables are connected to base stations generally shown as 15 and 16 respectively. The base stations are each as described in FIG. 1, but have not been separately referenced. The base stations are connected via a network 17, which corresponds to network 7, running horizontally relative to each building storey, and vertically down a side of the building to a processor and memory 18, which corresponds to processor 8 and memory 9 of FIG. 1.

While only three storeys have been shown in FIG. 2, it may be seen that the building could be a high rise building, and plural processors could be used and/or network repeaters. The processor can be connected to a PABX (not shown) to which fixed terminals could be connected and/or to a gateway switch or multiplexer to a central switching system such as a CENTREX system or other communication switching system. One such system is described in the aforenoted Carey et al patent.

Referring now to FIG. 3, a base station is shown. A network medium 7, such as an optical fiber is connected to a pair of transmission line (network medium) interfaces 20. One of the interfaces is connected to multiplexer 21 and the other is connected to demultiplexer 22.

Outputs of demultiplexer 22 are connected to three transmitters 23, 24 and 25. Transmitter 24 transmits on one carrier frequency e.g. F1 and transmitter 25 transmits a second carrier frequency 25. Transmitter 23 transmits a third carrier frequency $f_p$. More than three transmitters may be used, if desired.

The outputs of transmitters 23, 24 and 25 are connected to RF driver and receiver 26, which is connected to a leaky feeder 2A.

RF driver and receiver 26 is connected to the frequency F1 receiver 27, the frequency F2 receiver 28 and the frequency $f_b$ receiver 29. The outputs of receivers 27, 28 and 29 are connected to multiplexer 21, which is connected to transmission line interface 20.

The base station 5A described above, outlined by a dashed line block, is similar to base stations 5B–5E and 6A–6D except for the frequencies used as described above.

Operation of the invention will now be described with reference to FIGS. 1 and 3.

Assume that the portable wireless terminal 10A wishes to place a call. The user pushes a button or otherwise goes off hook, causing transmission of a carrier at the frequency $f_b$, with an identification word modulated thereon. This signal is received via leaky cables 1C and 3C, the closest cables to portable terminal 10A. The range of pickup is defined by the radius of micro-cell 32, the center of the micro-cell being defined by the intersection of leaky cables 3C and 1C. The diameter of the micro-cell is determined by the transmitter signal strength and sensitivity of the receiver in the associated base station.

The signal is received by receiver 29 and is applied to multiplexer 21, from which it is applied to network 7 via transmission line interface 20 for receipt by processor 8. Each of the base stations 6A–6C and 5A–5E communicate with processor 8 in a different time slot, preferably a duplexed time slot.

The identity of the portable terminal is stored in memory 9. With the processor 8 receiving the ID word and comparing it with the identity stored in memory 9, and knowing what time slot it has received the identity byte from with reference to base stations 5C and 6C which are connected to leaky cables 1C and 3C respectively, processor 8 thus determines which portable terminal is requesting service, and it identifies the micro-cell 32 in which the portable terminal 10A is located.

The portable terminal, when used in this way, can be merely a beacon transmitter which transmits its ID word automatically at certain intervals, e.g. for a short period of time every fifteen minutes. If attached to a piece of test equipment, for example, the processor 8 can store a location map or can display the location and identification of the beacon transmitter. It is preferred that each portable terminal should operate at least in this beacon mode, in order that its location should always be known.

If the beacon transmitter, carried on the piece of test equipment, for example is carried to another micro-cell, when the beacon transmits the processor can thus determine its location and update the location map or location and identification information.

It should be noted that the micro-cell peripheries overlap one another. Thus for example, if the portable terminal is at the location 10C, it is contained within two micro-cells 33 and 34. In this case when the portable terminal transmitter transmits, the signal will be received by leaky cables 3A, 3B and 1C. To deal with the multiple reception by various receivers 29 (FIG. 3) within each receiver, a signal strength detector is preferably used. Data sent from each receiver 29 via each multiplexer 21 to the processor 8 thus identifies not only reception of the signal by base stations 6A and 6B and 5C and its content, but also the signal strength received by each. If the strength of the received signal is greater by base station 6A than by base station 6B, the primary micro-cell containing the location of the transmitter 10C thus is designated by comparison of the signal strength signals in the microprocessor 8 as micro-cell 33 rather than micro-cell 34.

In this manner, the position of transmitter at location 10B which is contained within three micro-cells 32, 34 and 35 has been determined.

Alternatively, the position of the transmitter can be determined by processor 8 by noting that the beacon transmitter is being received by all or certain plural leaky feeders, and by deducing the only region in which the transmitter can be located while being received by those specific leaky feeders.

The above description has indicated how processor 8 can determine the location of a beacon transmitter, or receive a request for service from a portable telephone terminal. In the latter case a request for service signal is also transmitted containing a portable terminal ID word.

Consider now the case in which the portable terminal is to be used as a telephone. Assume that a call is to be made to the portable terminal. Its micro-cell location is known and stored in memory 9 by the processor 8 due to the above-described beacon operation.

The location of the called terminal is retrieved by processor 8 receiving data from the switching system designating the local number of the terminal to be called. The central processor then retrieves from memory 9 the micro-cell location which has been stored which contains the particular portable terminal to which a call is to be made, e.g. at location 10A. The processor 8 determines that either or both of base stations 5C and 6C which service the micro-cell 32 containing location 10A are idle at the frequency $f_p$. The processor then selects one of the base stations and transmits a signal on bus 7 which is demultiplexed in demultiplexer 22 (FIG. 3) and passes to transmitter 23, which transmits the signal via RF driver 26 to the corresponding leaky feeder, e.g. feeder 1C adjacent the portable terminal. The signal contains preferably a receive terminal identification byte and supervisory data at frequency $f_p$ causing the particular portable terminal to turn on its ringer. The supervisory information can also contain other information such as data which can be displayed at the portable terminal, e.g. the calling party identification or other data.

The portable terminal, recognizing its own ID word responds by turning on its ringer, and by transmitting a confirmation at the frequency $f_b$ to the base station 5C via leaky feeder 1C that its ringer has been turned on.

When the subscriber using the portable terminal at 10A subsequently answers, placing the terminal in the off-hook condition, a supervisory signal is again sent from the portable terminal via leaky feeder 1C to base station 5C, which is received via receivers 26 and 29, confirming the off-hook condition.

The central processor then sends an instruction via network 7 to base station 5C as to which of the two frequencies and which time slot is to be used. This information can be controlled merely by selecting which time slot is demultiplexed in demultiplexer 22, which automatically designates both the time slot and frequency F1 and F2 which is to be used. It can alternatively control a local processor associated with demultiplexer 22 to select the communication time slot and carrier frequency F1 or F2 in which the communication is to be made.

For example, if there are twelve two-way time slots associated with each of the carrier frequencies F1 and F2, twenty-four separate conversations could be carried on via base station 5C with portable terminals in all of the micro-cells which surround leaky feeder 1C. Alternatively the processor 8 could have selected one of the two carrier frequencies F5 or F6 used with base station 6C, each of which could carry twelve two-way conversations.

Thus, for example, within micro-cell 32 up to forty-eight two-way conversations could be accommodated.

Since each alternate base station utilizes the same set of frequencies and since two sets of mutually orthogonal leaky feeders are used, it may be seen that a large number of portable terminals can be accommodated. The invention is of course not restricted to the use of two communication frequencies within each base station. For a lightly populated system only one need be used, or more than two can be used. Further, the number of time shared channels used with each frequency can be decreased or increased to accommodate a current population of portable terminals, expected expansion requirements, a level of call blocking to be tolerated, if any, etc. Also, the invention is not restricted to alternating each base station with the same set of frequencies. The same set of frequencies can be repeated after plural intermediate base stations.

Returning now to the operation, as noted earlier, both the communication frequency and the time slot have been established. The processor also sends a signal to the portable terminal using the frequency $f_p$ via the network 7, demultiplexer 20, transmitter 23, RF driver 26 and the associated leaky cable instructing the portable terminal to utilize the particular frequency and time slot to match that determined for the base station.

In the progress of the call, the processor sends a supervisory signal to the portable terminal instructing it to inhibit its ringer.

The subscriber using the portable terminal thus communicates via the selected frequency and time slot through the designated base station, the network 7 and processor 8 to a switching system, or, via an internal time or space division switching system using the network 7 as a LAN whereby communication is effected with another portable terminal.

In the case in which a portable terminal has initiated the call, it can dial using multi-frequency tones which are transmitted, modulated on the communication frequency signals or which can be in digital form modulated on the communication frequency signals, and can be decoded by the processor 8 if it is to do the call connection, or sent to the switching system by processor 8 if the call is to be handled by the switching system.

In case a call is to be terminated, this can be effected either by the processor 8 sending command signals to the base station to be transmitted to the portable terminal to terminate, or to transmit a signal to the base station transmitter to cease transmitting in the allocated time slot. In the latter case the subscriber causes his portable terminal to enter the on-hook condition or the equivalent, shutting down his terminal.

If, during the course of a call, the portable terminal is moved into another micro-cell, this is sensed by the processor 8. For example, assume that the portable station 10A moves diagonally to the left and downwardly in FIG. 1 toward the diagonal corner and into another micro-cell associated with leaky feeders 3D and 1B. The switching system thus senses a reduction in the amplitude portion of the signal transmitted with the communication signal by the base station of the designated carrier. When the signal strength has reduced below a predetermined threshold, a command is sent by the processor to the portable terminal to transmit its identification on the signal frequency $f_p$. This signal is received by both base stations 6D and 5B, due to the closest adjacency of leaky feeders 3D and 1B. If the base station had moved merely across to the left, rather than diagonally, the ID signal at frequency $f_p$ would have been received by base stations 6C and 5B associated with leaky feeders 3C and 1B.

As with the beacon operation described above, the processor 8 determines which base station should be used, which carrier frequency F5, F6, F3, F4, F7, or F8 should be used, and a command signal is sent to the base stations and to the portable terminal to switch to the chosen base station and to an idle frequency and time slot.

As an alternative, rather than commanding the portable terminal to transmit its identification once the signal from it has reduced below a certain threshold, the portable terminal can be caused either inherently, or on command by the processor 8, at predetermined intervals, e.g. at every five seconds to transmit its identification at the frequency $f_p$, in order to update its location and store it in memory 9, and to effect a communication frequency change and base station change if the portable terminal has moved into another micro-cell.

Indeed, the processor 8 can command the base stations and portable terminals to change frequencies even within a single cell if the traffic warrants it. For example, all twenty-four channels associated with both carrier frequencies handled by a single base station may fill up, and with the introduction of another portable terminal within the micro-cell, one or more of the portable terminals may be ordered to change frequencies to one or others handled by a base station connected to an orthogonally disposed leaky feeder, defining the same micro-cell.

Figure 4:
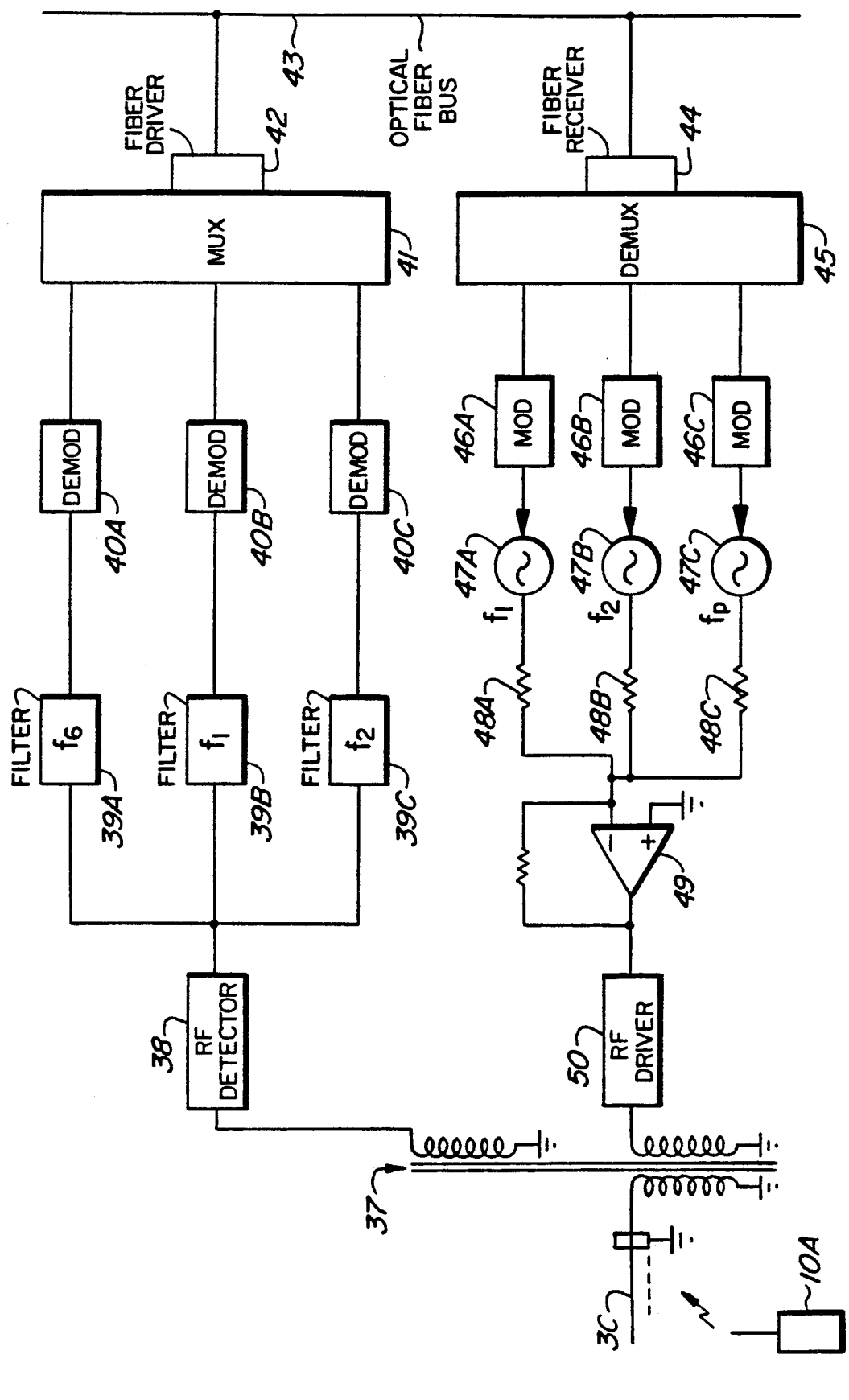

Turning now to FIG. 4, a more detailed block diagram of a base station is shown. Representative portable terminal 10A transmits in a wireless manner to representative leaky feeder 3C.

The leaky feeder is connected to a primary winding of transformer 37. A first secondary winding is connected to an RF detector 38, which is connected to three bandpass filters 39A, 39B and 39C. Filter 39A is bandpass filter for the above-described frequency $f_b$, filter 39B is a bandpass filter for one of the two frequencies, e.g. F1, received from the portable terminal in the base station, and filter 39C is a bandpass filter for passing a signal at the second frequency, e.g. F2.

The filters are connected to corresponding demodulators 40A, 40B and 40C. The outputs of demodulators 40A, 40B and 40C are connected to inputs of multiplexer 41, the output of which is connected through fiber driver 42 to an optical fiber bus 43 (corresponding to network 7 described earlier). Processor 8 (FIG. 1) is connected to the bus 43 through a corresponding fiber interface (not shown).

The base station also is comprised of a fiber receiver 44, which is connected to the optical fiber bus 43. The fiber receiver is connected to the input of demultiplexer 45, the outputs of which are connected to modulators 46A, 46B and 46C. The outputs of modulators 46A, 46B and 46C are connected to corresponding carrier signal generators 47A, 47B and 47C, which generate carrier signals at the frequencies F1, F2 and $F_p$ respectively. The outputs of carrier generators 47A, 47B and 47C are connected via loads 48A, 48B and 48C together to a buffer amplifier 49, the output of which is connected to the input of RF driver 50. The output of RF driver 50 is connected to a second secondary of transformer 37.

In operation, signals received from portable terminal 10A are passed through leaky feeder 3C and transformer 37 to RF detector 38, where the signal is detected. The particular carrier frequency $F_b$ or communication frequency carrier are filtered in filters 39A, 39B or 39C, demodulated in demodulator 40A, 40B or 40C and applied to multiplexer 41. Multiplexer 41 multiplexes the signals received in the different time slots at the various frequencies received at the various portable terminals whose signals are received on leaky feeder 3C, and applies the multiplexed signals via fiber driver 42 to the bus 43.

Signals received from the processor 8 via bus 43 pass through fiber receiver 44, are demultiplexed in demultiplexer 45, designated for the particular frequencies, and are within the required time slots as a result of the demultiplexing function. The modulators 46A, 46B and 46C modulate the carrier signals $F_p$ and one of the communication frequency signals in carrier generators 47A, 47B and 47C, which are combined, are passed through buffer amplifier 49 and are amplified by RF driver 50. The resulting radio frequency signal passes through transformer 37 to leaky feeder 3C, from which the signal is transmitted. The portable terminal to which the signal is addressed, or operating within a particular time slot reserved for that portable terminal receives the signal from the processor 8. This can, as noted above, be either a command signal or a communication signal from another portable terminal or another fixed terminal.

Figure 5:
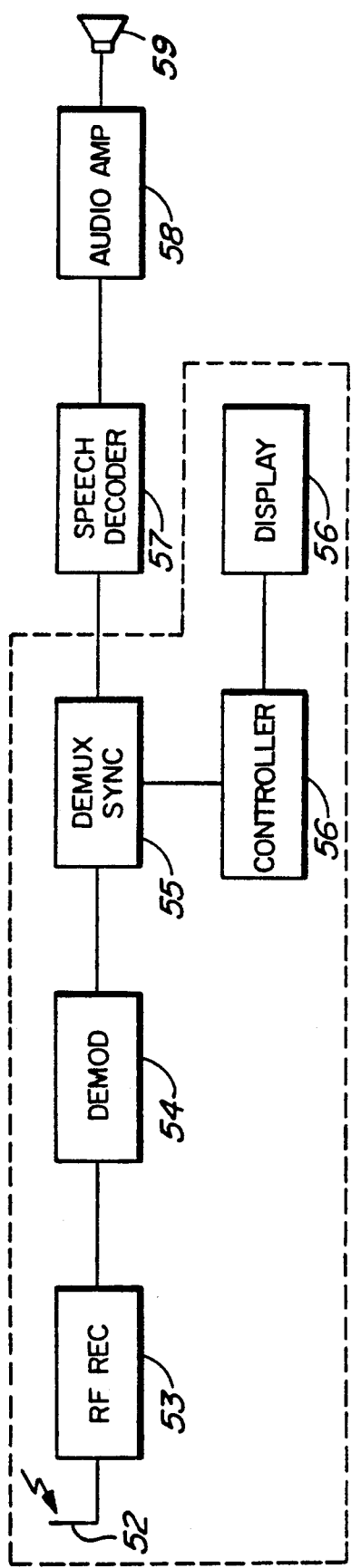

FIG. 5 illustrates a portable terminal in one configuration, that of a pager. The signal is received via the portable terminal antenna 52, and is received in RF receiver 53, which contains a tuner at frequency 23. The resulting signal is demodulated in demodulator 54, is demultiplexed in demultiplexer 55, and is detected by controller 56. Controller 56 determines whether the demultiplexed signal is addressed to its pager. If not, it ignores the signal. If it is addressed it receives the supervisory or control signal which follows the address, and if the portable terminal contains a display 56, displays a message on it and operates an alerting device such as a vibrator, tone, etc.

The structure described above as may be used in a pocket pager is shown in dashed outline. However if the pager is to provide a speech signal output, a speech decoder 57 is connected to the demultiplexer 55. The controller 56 recognizing the address, thus causes the multiplexer 55 to apply the following signal to speech decoder 57, which decodes a received speech signal from digital to analog, applies it to audio amplifier 58, and passes it to speaker 59.

Figure 6:
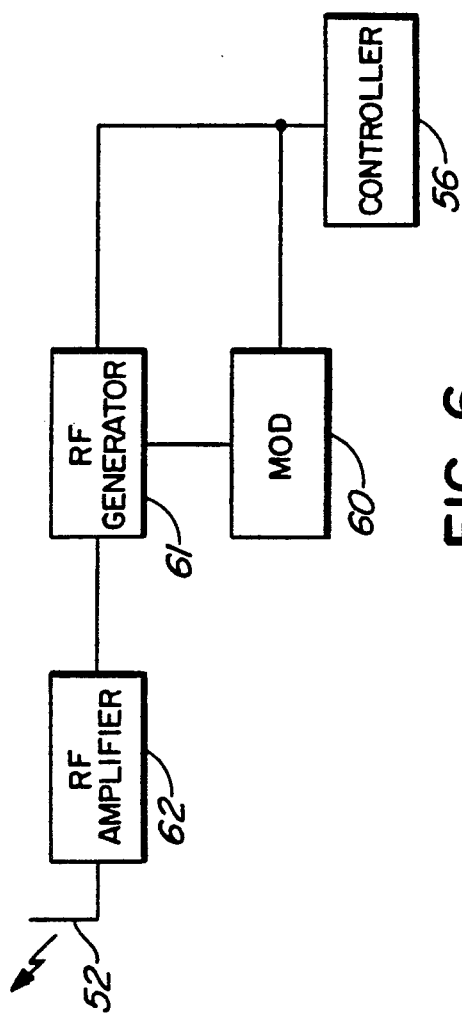

FIG. 6 illustrates the structure used merely as a location beacon. Controller 56 is connected to modulator 60 and carrier frequency generator 61, causing modulation of the carrier 61 to transmit the identification of the beacon by modulation of the carrier at predetermined intervals, as described earlier. The modulated RF signal passes through RF amplifier 62 to antenna 52 from which it is transmitted to an adjacent leaky cable.

Figure 7:
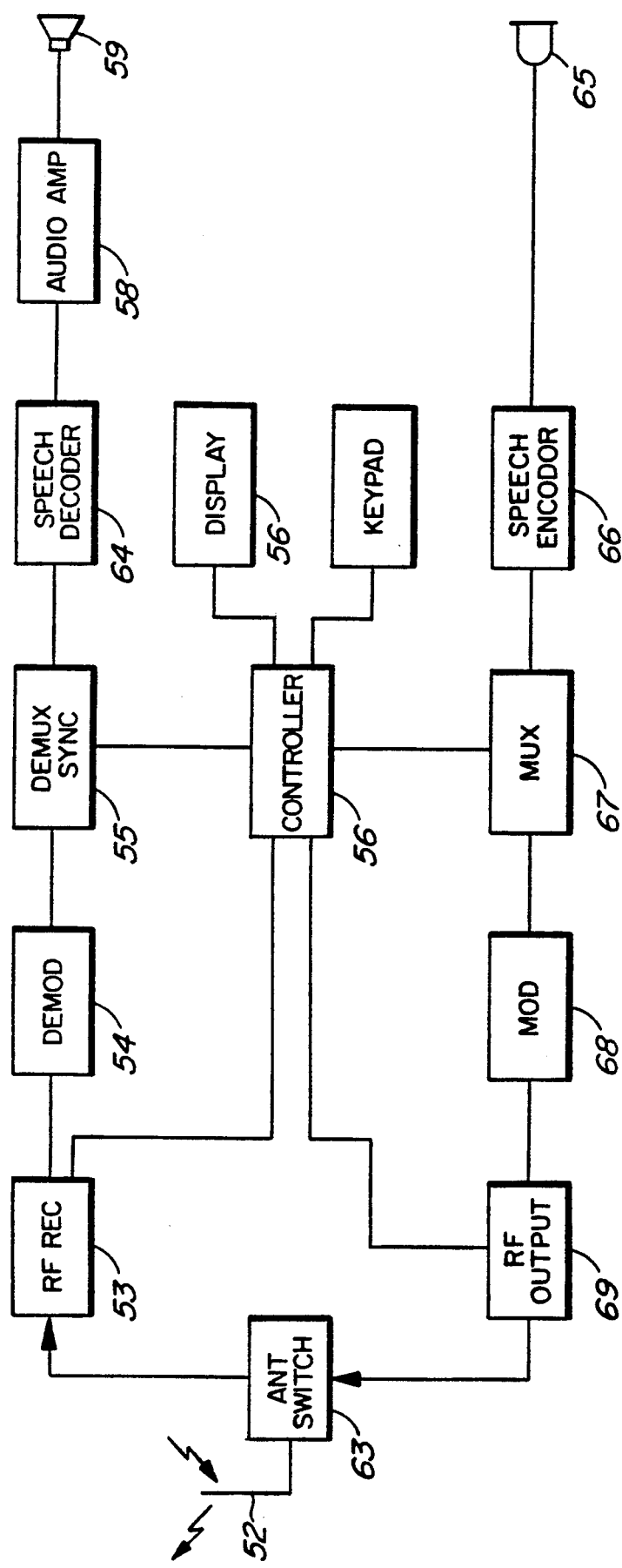

FIG. 7 illustrates a block diagram of a voice communicating portable terminal. Antenna 52 is connected to antenna switch 63, an output of which is connected to RF receiver 53. The output of receiver 53 is connected to demodulator 54, which is connected to the input of demultiplexer 55. Controller 56 is connected to demultiplexer 55, and display 56 is connected to controller 56. The output of demultiplexer 55 is connected to speech decoder 64, the output of which is connected to audio amplifier 58, which is connected to speaker 59.

When a signal is received by antenna 52 it passes through antenna switch 63 into RF receiver 53 which operates as described with reference to FIG. 5. The resulting signal is demodulated in demodulator 54 as described earlier, is demultiplexed in demultiplexer 55, and if addressed to the present portable terminal, a message can be displayed on display 56.

The received signals can cause controller 56 to synchronize with the received signal, to control the demultiplexer 55 to switch to a particular time slot and to cause RF receiver 53 to tune to a particular receive frequency. The received digitized voice communication signal, if that is the form of communication used, is passed through the RF receiver 53, is demodulated, demultiplexed, and passed through speech encoder 64 to audio amplifier 58 from which it is applied to speaker 59, which voice signal is reproduced either loudly, or in a handset earpiece.

When a subscriber speaks into microphone 65, its output signal is passed to speech encoder 66, the digitally encoded output signal being applied to multiplexer 67. Controller 66 causes the signal to be applied into the previously designated time slot. The resulting output signal is passed into modulator 68 which modulates a radio frequency signal designated by controller 56 which had received the voice frequency communication supervisory signal from processor 8. The resulting modulated output signal from RF amplifier 69 is applied to antenna switch 63. When antenna switch 63 receives an RF output signal to be transmitted, it switches the antenna from receiver 53 to the output of RF output 69 in order not to overload the input of RF receiver 53. The resulting signal is transmitted via antenna 52 to the closest leaky feeders in a micro-cell, which is controlled by the base station designated by processor 8.

In the above-described manner, a large number of beacons, paging receivers and portable telephones can be accommodated within a locally confined space, by designating micro-cells, reusing frequencies and time slots associated with non-adjacent parallel leaky feeders.

Communication may be effected in this invention using any standard, for example, DECT, CT-2, CT2 Plus, CT3, or any other mode which will be understood to operate by a person skilled in the art understanding this invention. For example, the CT-2 or CT2 Plus standard can be used with spread spectrum.

Figure 8:
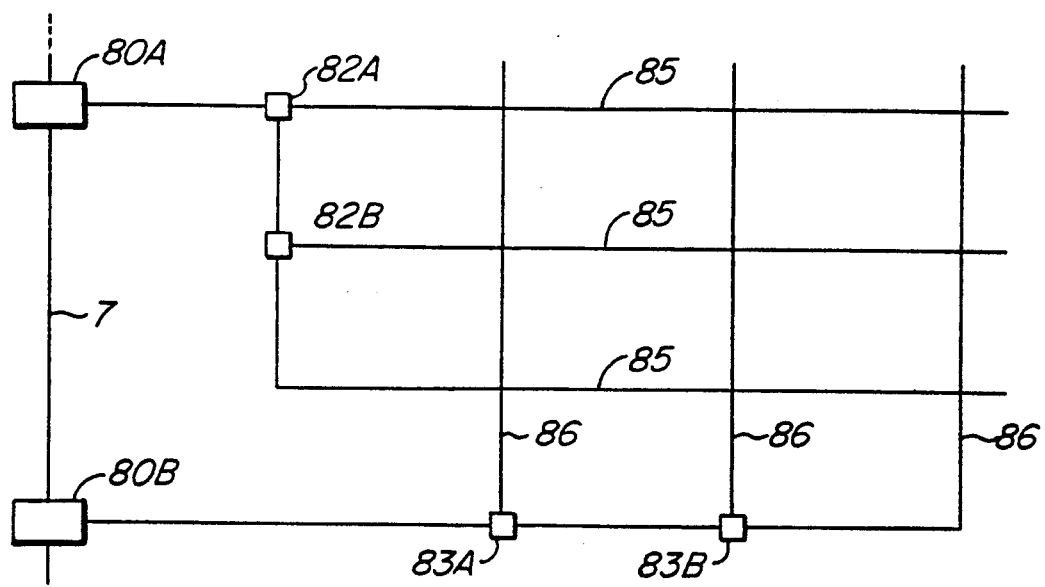

FIG. 8 illustrates in block diagram another embodiment of the invention. Each base station 80A, 80B, etc., is connected to multiple splitters 82A, 82B and 83A, 83B, etc. Each splitter is connected to one or more leaky cables 85 and 86 which are laid in the ceilings or floors of a building in a grid pattern. The base stations are connected to a microprocessor via network 7.

Each base station 80B which feeds a group of leaky feeders which extend parallel to a Y axis communicates using a frequency $fc_y=f_{13}$ to $f_{25}$, while each base station 80A which communicates with leaky feeders 85 which are parallel to an X axis, which is orthogonal to the Y axis, utilizes a frequency $fc_x=f1$ to $f12$. In this case it may be seen that full radio frequency coverage can be provided to an entire floor using either the base station operating on frequencies $fc_x$ or $fc_y$. Therefore, in some installations it may be desirable to utilize only leaky feeders 85 or leaky feeders 86.

It may be seen that no additional floor area is covered using both base station 80A and base station 80B, and furthermore, since the signal transmitted by either is split in one of the splitters and is applied to all of the associated leaky feeders, the entire region covered by either set of parallel leaky feeders or both sets of orthogonal leaky feeders, and can be defined as a mini-cell. Plural mini-cells located over the floor area of a building can provide the location function described above. Alternatively, one floor of a building covered by a mini-cell, used in concert with plural similar structures, one covering each floor of a high rise building provides a location function in the building in a manner described above.

For the structures described with reference to FIG. 8 which forms a single mini-cell, the reason that orthogonal leaky feeders connected to separate base stations 80A and 80B are used, is to increase the number of frequencies, and thus the number of portable terminals that can be accommodated within a single mini-cell. It also allows redundancy.

Clearly more than two orthogonal groups of leaky feeder lines can be utilized, in order to accommodate more RF channels, for base stations having a limited number of frequencies. The leaky feeders need not be parallel to X and Y orthogonal axes; another group of leaky feeders or a substitute group of leaky feeders may be used which are, e.g. diagonal to the ones shown in FIG. 8.

Figure 9:
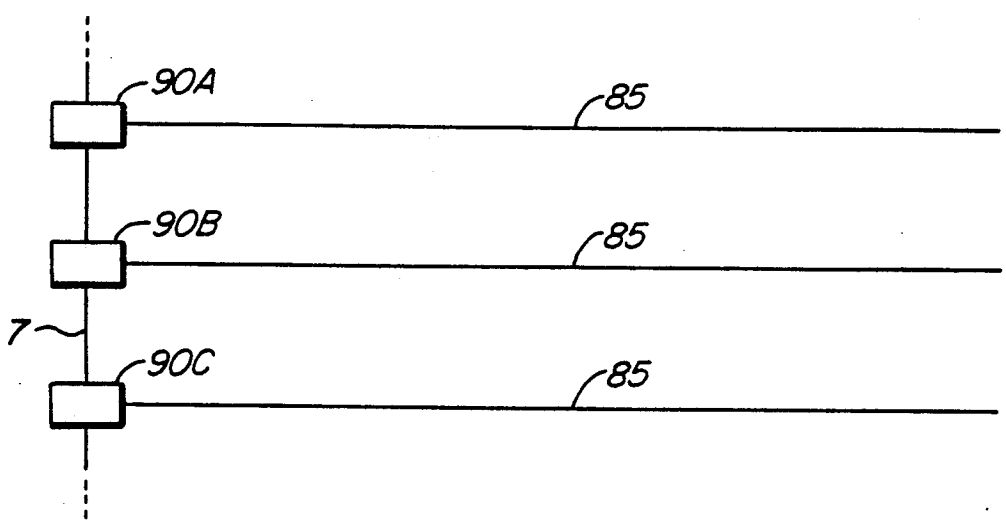

FIG. 9 illustrates the case referred to above, of parallel leaky feeders 85 whose effective radio frequency field covers an area of utilization without requiring leaky feeders which are parallel to an axis orthogonal thereto. The base stations 90A, 90B and 90C can each operate using communication frequencies $F_1$–$F_{12}$. Alternatively, by using the single base station and multiple splitters configuration described with reference to FIG. 8, plural base stations can be dispensed with.

Figure 10:
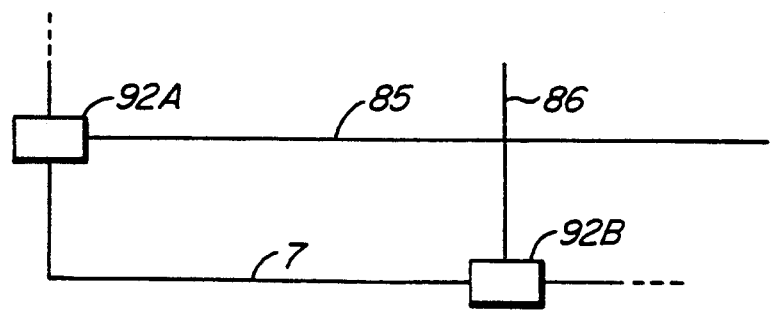

FIG. 10 is similar to FIG. 9 except that there is only one leaky feeder 85 extending along the X axis, and only one leaky feeder 86 extending along the Y axis, each connected to a corresponding base station 92A and 92B. The two cables define a mini-cell as described above. The base stations 92A and 92B can operate communication frequencies which are either identical, as described with reference to FIGS. 8 and 9, or are different as described with reference to FIG. 1.

Indeed, by utilizing only one cable per building storey, e.g. either 85 or 86, each defining a mini-cell, a multiple storey building can be covered. In this case the portable terminal location scheme described with reference to FIGS. 1-8 can be utilized, with the network 7 running up the building in the manner of a backbone. The mini-cells are thus stacked vertically, rather than being dispersed horizontally and stacked vertically.

Since the CT-2 standard limits each base station to a maximum of twelve radio frequency channels, overlaying leaky feed as described herein, allows more radio frequency channels per unit area to be used, and thus more portable terminals to be used per unit area. Further, by the use of spread spectrum, the maximum radio frequency radio intensity at a particular frequency is minimized, thus allowing minimal interference with other services, and confidentiality of communication.

A person skilled in the art understanding this invention may now conceive of variations or other embodiments using the principles of the invention described herein. All are considered to be within the scope of the invention as defined in the claims appended hereto.

What is claimed is:

1. A wireless communication system comprising:
  (a) a plurality of antennae, the antenna being arranged in a grid pattern over a communication region, each antenna being a leaky coaxial cable, whereby a grid pattern of leaky coaxial cables is formed,
  (b) wireless portable terminals located within the communication region for emitting and/or receiving electromagnetic signals via said antennae,
  (c) means for locating the position of at least one of said wireless portable terminals within the communication region relative to said grid pattern, comprising:
    (i) crossovers within the grid pattern of orthogonal ones of said cables defining the centers of microcells for defining the position of said at least one of said terminals,
    (ii) at least one first base station including at least one corresponding transceiver connected to one end of corresponding one or plural cables which are parallel in one direction, and at least one second base station including at least one corresponding transceiver each connected to one end of corresponding one of plural cables which are parallel in a second direction.
    (iii) a transmission line connected to each of the base stations;
    (iv) processing means connected to the transmission line, comprising means for storing a predetermined identity of each of said portable terminals associated with a micro-cell, means for detecting the identity of a portable terminal and for detecting the identity of first and second base stations connected to leaky cables which are closest to said portable terminal, for comparing the detected identity of the first and second base stations with said stored predetermined identity and for thereby determining the position of said portable terminal.
  (d) each portable terminal being comprised of means for transmitting an identification signal.
  (e) each base station being comprised of means for generating an identification signal, and including means for transmitting its own identification signal with the identification signal of said portable terminal upon reception thereof, to said processor means,
  (f) said portable terminal being comprised of means for transceiving communication signals, means for transmitting identification and supervisory signals, and means for receiving supervisory and/or control signals,
  (g) each of the base stations including means for transmitting signals via one or more related leaky cables to said plural portable terminals in a time shared digital packet mode modulated on a particular frequency signal, each of the base stations transmitting at a particular frequency which is different from a particular frequency of its closest neighboring base station.

2. A system as defined in claim 1 in which said one direction and said second direction are orthogonal to each other.

3. A system as defined in claim 1, in which said one terminal is comprised of a becon transmitter for periodically transmitting a single comprised of its said identification signal.

4. A system as defined in claim 1, in which said one terminal is comprised of a paging receiver, including means for receiving a signal directed to said one terminal identified by an unique identification signal via at least one base station and an associated leaky cable which is in a micro-cell containing said paging receiver.

5. A system as defined in claim 1 in which the communication signals are voice signals.

6. A system as defined in claim 1 in which each of the base stations includes means for transmitting signals via a related leaky cable to plural portable terminals at different frequencies.

7. A wireless communication system comprising:
 (a) a plurality of antennae, the antenna being arranged in a grid pattern over a communication region, each antenna being a leaky coaxial cable, whereby a grid pattern of leaky coaxial cables is formed,
 (b) wireless portable terminals located within the communication region for emitting and/or receiving electromagnetic signals via said antennae,
 (c) means for locating the position of at least one of said wireless portable terminals within the communication region relative to said grid pattern, comprising:
  (i) crossovers within the grid pattern of orthogonal ones of said cables defining the centers of micro-cells for defining the position of said at least one of said terminals,
  (ii) at least one first base station including at least one corresponding transceiver connected to one end of corresponding one or plural cables which are parallel in one direction, and at least one second base station including at least one corresponding transceiver each connected to one end of corresponding one of plural cables which are parallel in a second direction.
  (iii) a transmission line connected to each of the base stations;
  (iv) processing means connected to the transmission line, comprising means for storing a predetermined identity of each of said portable terminals associated with a micro-cell, means for detecting the identity of a portable terminal and for detecting the identity of first and second base stations connected to leaky cables which are closest to said portable terminal, for comparing the detected identity of the first and second base stations with said stored predetermined identity and for thereby determining the position of said portable terminal.
 (d) each portable terminal being comprised of means for transmitting an identification signal.
 (e) each base station being comprised of means for generating an identification signal, and including means for transmitting its own identification signal with the identification signal of said portable terminal upon reception thereof, to said processor means,
 (f) said portable terminal being comprised of means for transceiving communication signals, means for transmitting identification and supervisory signals, and means for receiving supervisory and/or control signals,
 (g) each of the base stations including means for transmitting signals via a related leaky cable to portable terminals in a time shared, spread spectrum mode, each of the portable terminals utilizing a different spreading code.

8. A system as defined in claim 7 in which said one direction and said second direction are orthogonal to each other.

9. A system as defined in claim 7, in which said one terminal is comprised of a beacon transmitter for periodically transmitting a signal comprised of its said identification signal.

10. A system as defined in claim 7, in which said one terminal is comprised of a paging receiver, including means for receiving a signal directed to said one terminal identified by an unique identification signal via at least one base station and an associated leaky cable which is in a micro-cell containing said paging receiver.

11. A system as defined in claim 7 in which the communication signals are voice signals.

12. A system as defined in claim 7 in which each of the base stations includes means for transmitting signals via a related leaky cable to plural portable terminals at different frequencies.

13. A wireless communication system comprising:
 (a) a plurality of antennae, the antennae being arranged in a grid pattern over a communication region, and being comprised of at least one elongated coaxial cable located over a communication region on each floor of a multi-story building, each cable defining a mini-cell;
 (b) wireless portable terminals located within the communication region for emitting and/or receiving electromagnetic signals via said antennae,
 (c) means for locating the position of at least one of said terminals within the communication region relative to said grid pattern including plural first base stations including transceivers each connected to one end of said cables which are parallel in one direction, and plural second base stations including transceivers each connected to one end of said cables which are parallel in a second direction, and further including a transmission line connected to each of the base stations, the transmission line being disposed vertically up the building.

14. A system as defined in claim 13, in which said means for locating further includes processing means connected tot he transmission line, the processing means comprising means for storing a predetermined identity of each of said portable terminals associated with a micro-cell, means for detecting the identity of a portable terminal and for detecting the identity of first and second base stations connected to leaky cables which are closest to said portable terminal, for comparing the detected identity of the first and second base stations with said stored predetermined identity and for thereby determining the position of said one terminal.

15. A system as defined in claim 14 in which each portable terminal is comprised of means for transmitting an identification signal, in which each base station is comprised of means for generating an identification signal, and means in each base station for transmitting its own identification signal with the identification signal of said one terminal upon reception thereof, to said processor means.

16. A wireless communication system comprising:
(a) a plurality of antennae, the antennae being arranged in a grid pattern over a communication region and being comprised of at least one elongated coaxial cable located over a communication region on each floor of a multi-story building, each cable defining a mini-cell;
(b) wireless portable terminals located within the communication region for emitting and/or receiving electromagnetic signals via said antennae;
(c) means for locating the position of at least one of said terminals within the communication region relative to said grid pattern including processing means connected to the transmission line, the processing means comprising means for storing a predetermined identity of each of said portable terminals associated with a microcell, means for detecting the identity of a portable terminal and for detecting the identity of first and second base stations connected to leaky cables which are closest to said portable terminal, for comparing the detected identity of the first and second base stations with said stored predetermined identity and for thereby determining the position of said one terminal.

17. A system as defined in claim 16 in which each portable terminal is comprised of means for transmitting an identification signal, in which each base station is comprised of means for generating an identification signal, and means in each base station for transmitting its own identification signal with the identification signal of said one terminal upon reception thereof, to said processor means.

* * * * *